Figures 1, 2:
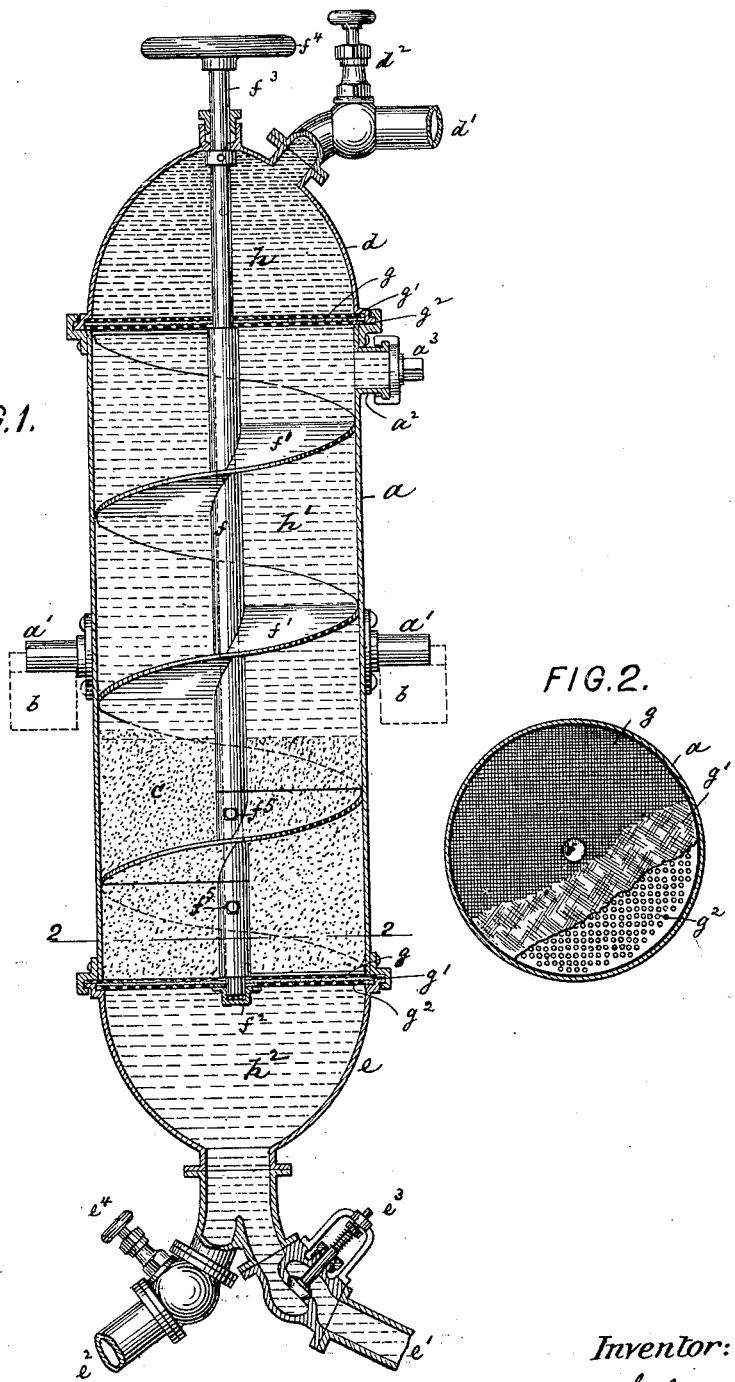

No. 649,490. Patented May 15, 1900.
O. SELG.
FILTER.
(Application filed Jan. 23, 1900.)
(No Model.)

Witnesses:
John Becker.
William Miller.

Inventor:
Otto Selg
by his attorneys
Roeder & Briesen

UNITED STATES PATENT OFFICE.

OTTO SELG, OF NEW YORK, N. Y., ASSIGNOR OF TWO-THIRDS TO CARL GUNTRUM, OF SAME PLACE, AND EUGENE SELG, OF BOSTON, MASSACHUSETTS.

FILTER.

SPECIFICATION forming part of Letters Patent No. 649,490, dated May 15, 1900.

Application filed January 23, 1900. Serial No. 2,426. (No model.)

*To all whom it may concern:*

Be it known that I, OTTO SELG, a citizen of the United States, and a resident of New York, (Brooklyn,) county of Kings, and State of New York, have invented certain new and useful Improvements in Filters, of which the following is a specification.

This invention relates to a filter for beer, wort, water, or other liquid which is so constructed that a loose filtering-body may be readily packed and unpacked to any degree of density desired. Thus not only can the defecation be readily regulated, but when the filter is to be washed out the filtering material may be first loosened, so as to permit the free passage of the wash-water.

In the accompanying drawings, Figure 1 is a longitudinal central section, partly in elevation, of my improved filter; and Fig. 2, a cross-section on line 2 2, Fig. 1, showing parts partly broken away.

The letter $a$ represents the cylindrical body or shell of the filter, hung by trunnions $a'$ upon suitable supports $b$, so that it may be tilted to any angle desired. The shell $a$ is provided near its upper end with an inlet $a^2$, having cap $a^3$ and adapted for the introduction of the pulp or other loose or powdered filtering-body $c$. At its upper end the shell $a$ is coupled to a removable head $d$, having pipe $d'$, controlled by cock $d^2$, and through which the material to be filtered is introduced or the wash-water ejected. At its lower end the shell is coupled to a removable head $e$, having branched pipes $e'$ $e^2$. The pipe $e'$ serves for the outlet of the filtered product and is provided with an adjustable check-valve $e^3$, adapted to regulate the flow of the liquid. The pipe $e^2$ is provided with a cock $e^4$ and serves for the introduction of wash-water, by means of which the filter may be cleaned.

Longitudinally through the filter there extends a hollow shaft $f$, provided with the spiral blade $f'$, which extends to near the inner face of the shell $a$, the whole constituting a spiral conveyer or compressor. The hollow shaft $f$ embraces a spindle $f^3$, supported upon a step $f^2$ and provided with a hand-wheel $f^4$. If desired, the hollow shaft $f$ may be made sectional, each section being removably secured to spindle $f^3$ by a set-screw $f^5$. Thus by adjusting the distance between the lowermost spiral and the lowermost strainer the depth of the filtering-body supported upon the latter may be adjusted.

The space inclosed by the filter is subdivided into three compartments $h$ $h'$ $h^2$ by means of two strainers located above and below the blade $f'$, respectively. Each of the strainers is composed, preferably, of an upper fine metal screen $g$, a central filtering-cloth $g'$, and a coarser lower metal screen $g^2$, as more fully shown in Fig. 2.

The operation is as follows: The filtering-body $c$ is introduced through opening $a^2$ and the conveyer $f f'$ is rotated so as to conduct the same downward and cause it to settle upon the lower strainer. By a further, greater or less, turn of the conveyer the material $c$ may now be packed to any extent desired, so that in this way the fineness of the filter may be adjusted in a simple and accurate manner. The pipe $d'$ is now coupled to the receptacle that contains, preferably under pressure, the beer, wort, water, or other liquid to be filtered. This liquid passes first through the upper strainer to entrap the solid or coarser particles, if any, within compartment $h$. Then the liquid passes through the filtering material $c$, lower strainer, and out through the pipe $e'$.

If it is desired to wash the filter, the conveyer $f f'$ is turned backward to lift the material $c$ and loosen or unpack it. Next the pipe $e^2$ is connected to a source of steam or water supply under pressure and the pipe $d'$ is uncoupled from the tank. The wash-water or steam will pass first freely through the loosened filtering material $c$ and will thoroughly clean it and will then pass through the chamber $h$ to take along the solid particles and eject them through the pipe $d'$, which now serves as an outlet.

It will be seen that in my improved filter the density of the filtering-body is under the full control of the operator, so that not only the defecation may be accurately regulated, but that the filtering material may be readily washed out by being previously loosened or unpacked, so as to permit the free passage of the wash-water.

What I claim is—

1. A filter composed of a shell, an inclosed filtering-body, and a rotatable spiral conveyer adapted to engage and compress said body, substantially as specified.

2. A filter composed of a shell, an inclosed filtering-body, a rotatable spiral conveyer adapted to engage and compress said body, and a strainer below said conveyer upon which the filtering-body is supported, substantially as specified.

3. A filter composed of a shell, an inclosed filtering-body, a rotatable spiral conveyer adapted to engage and compress said body, and strainers above and below the conveyer, substantially as specified.

4. The combination in a filter, of a shell with an upper removable head having an inlet, a lower removable head having an inlet and an outlet, strainers at the upper and lower ends of the shell, a rotatable spiral conveyer within the shell, and a filtering-body adapted to be engaged and compressed by said conveyer, substantially as specified.

Signed by me at New York city, county and State of New York, this 20th day of January, 1900.

OTTO SELG.

Witnesses:
WILLIAM SCHULZ,
F. V. BRIESEN.